United States Patent
Lysaght

[11] Patent Number: 5,937,370
[45] Date of Patent: Aug. 10, 1999

[54] TOOL MONITOR AND ASSEMBLY QUALIFIER

[75] Inventor: Richard G. Lysaght, Hicksville, Ohio

[73] Assignee: C.E. Electronics, Inc., Bryan, Ohio

[21] Appl. No.: 08/936,187

[22] Filed: Sep. 17, 1997

[51] Int. Cl.[6] .................................................. G01L 1/02
[52] U.S. Cl. .......................... 702/138; 702/41; 173/180; 173/181; 73/862.21
[58] Field of Search .............................. 702/138, 41, 114, 702/115, 182, 113; 364/468.01; 173/177, 178, 180, 181; 91/59, 1; 81/470; 227/130; 73/862.23, 1.12, 1.57, 1.59, 862.21

[56] References Cited

U.S. PATENT DOCUMENTS

| | | |
|---|---|---|
| 3,683,686 | 8/1972 | Sergan . |
| 4,051,351 | 9/1977 | Mallick, Jr. et al. .................... 364/400 |
| 4,281,538 | 8/1981 | Dudek .................................. 73/862.21 |
| 4,294,110 | 10/1981 | Whitehouse ........................ 73/862.23 |
| 4,562,746 | 1/1986 | Petit ..................................... 73/862.23 |
| 4,644,848 | 2/1987 | McKendrick .............................. 91/419 |
| 4,791,838 | 12/1988 | Bickford et al. ........................... 81/467 |
| 4,864,903 | 9/1989 | Bickford et al. ........................... 81/467 |
| 5,014,793 | 5/1991 | Germanton et al. ....................... 173/12 |
| 5,154,242 | 10/1992 | Soshin et al. ............................ 173/178 |
| 5,370,022 | 12/1994 | Rodriguez et al. . |
| 5,377,578 | 1/1995 | Borries . |
| 5,439,063 | 8/1995 | Anders et al. . |
| 5,467,674 | 11/1995 | Thorn . |
| 5,491,994 | 2/1996 | Baldyga . |
| 5,544,534 | 8/1996 | Fujitaka ................................ 73/862.23 |
| 5,548,787 | 8/1996 | Okamura . |
| 5,549,157 | 8/1996 | Johnson et al. . |
| 5,552,987 | 9/1996 | Barger et al. . |
| 5,567,886 | 10/1996 | Kettner . |
| 5,592,396 | 1/1997 | Tambini et al. . |
| 5,594,306 | 1/1997 | Caporusso et al. . |
| 5,614,774 | 3/1997 | McCallops et al. . |
| 5,689,434 | 11/1997 | Tambini et al. ........................ 364/510 |

*Primary Examiner*—John Barlow
*Assistant Examiner*—Patrick Assouad
*Attorney, Agent, or Firm*—Emch, Schaffer, Schaub & Porcello Co., L.P.A.

[57] ABSTRACT

This counting apparatus is a tool monitor and assembly qualifier that verifies that the correct number of fasteners have been properly installed into an assembly. When used in conjunction with a pressure tool, proper fastener torque and count can be verified. The device monitors internal tool pressures and has the ability to "learn" the pressure characteristics of the tool during the assembly process. This assembly qualifier is a device that monitors either the pressure of an air tool, the current of an electrical tool or the torque of a mechanical wrench to determine if the tool shut off at a target torque. The qualifier also determines if some unknown means shuts off the tool.

12 Claims, 18 Drawing Sheets

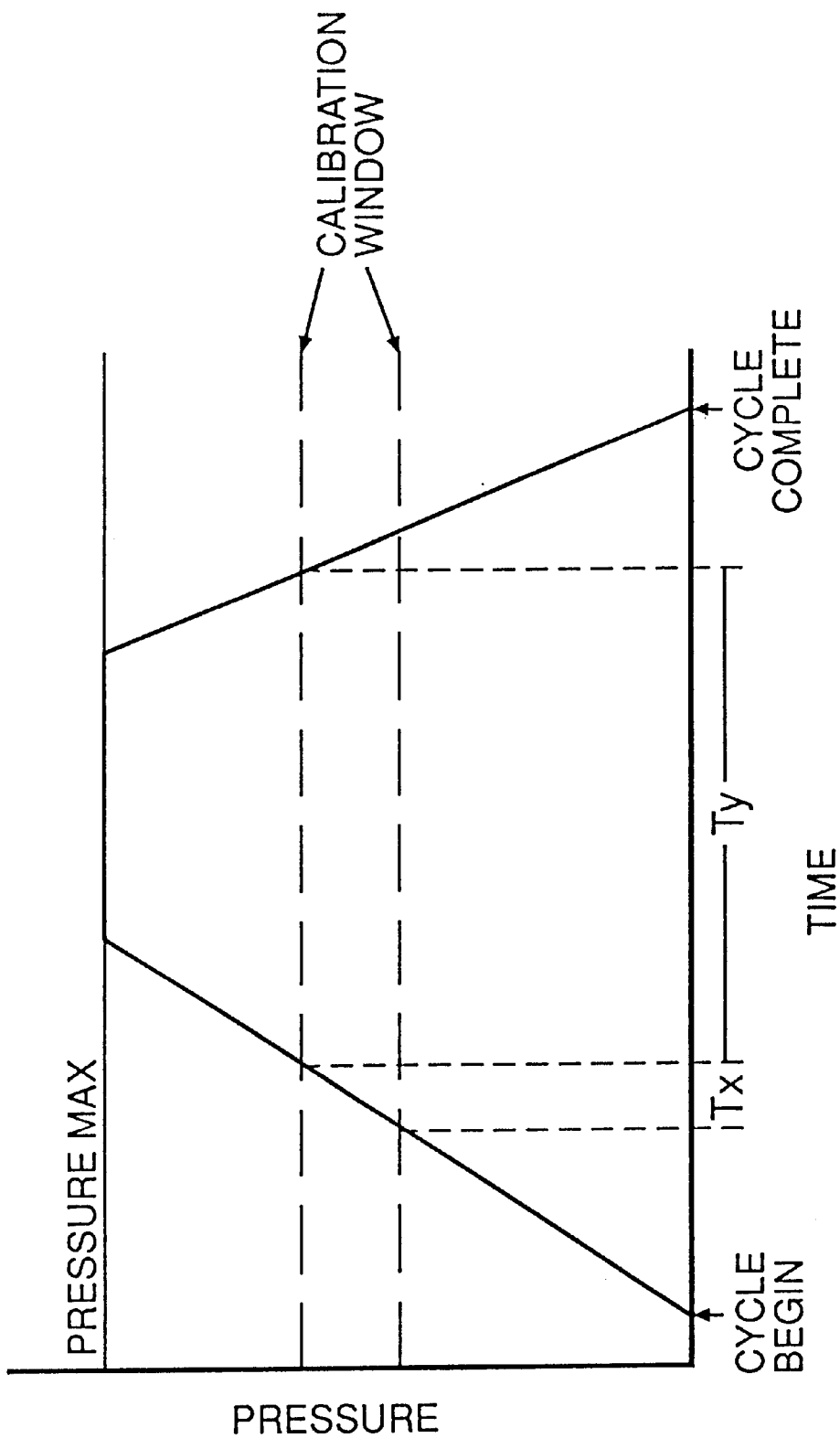

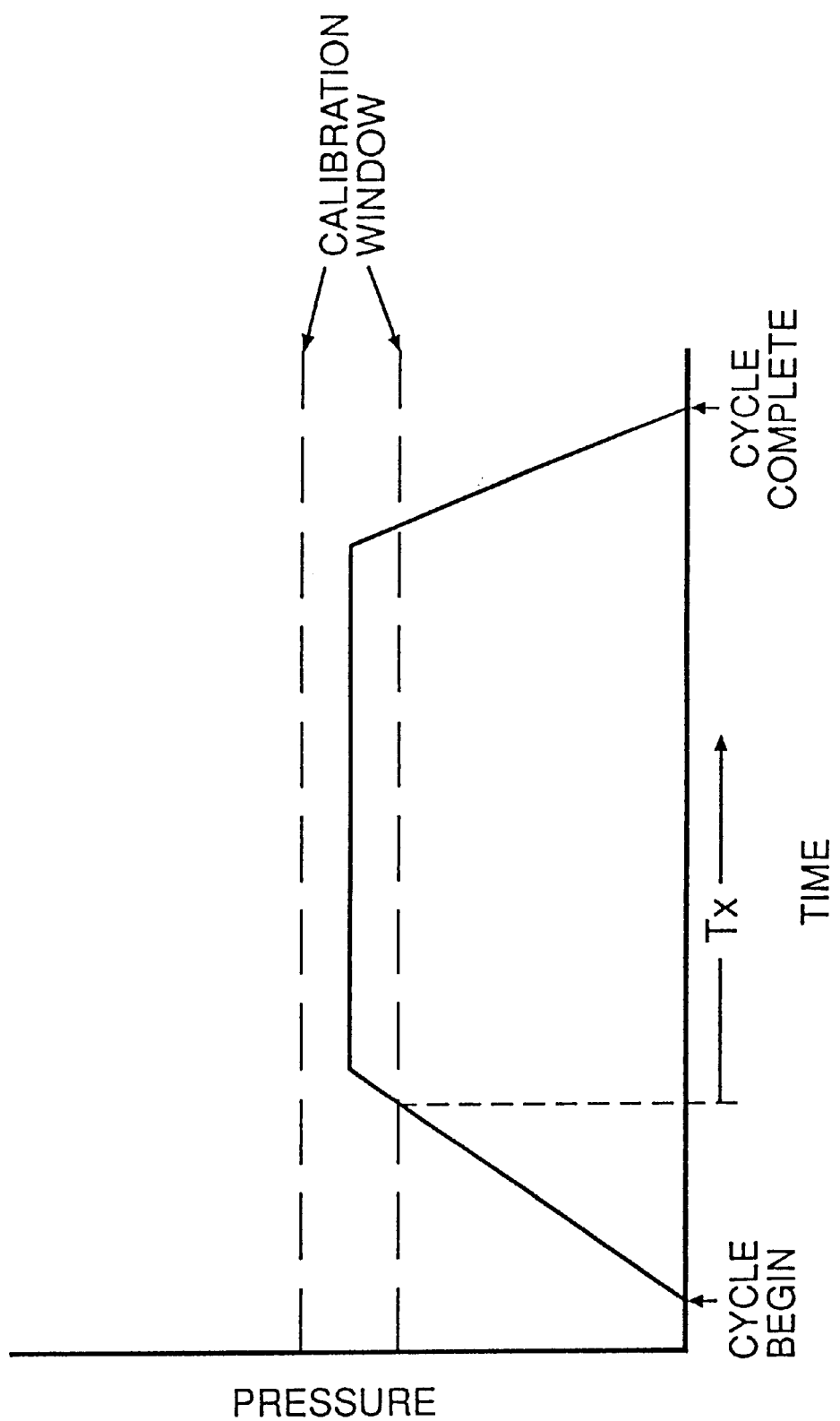

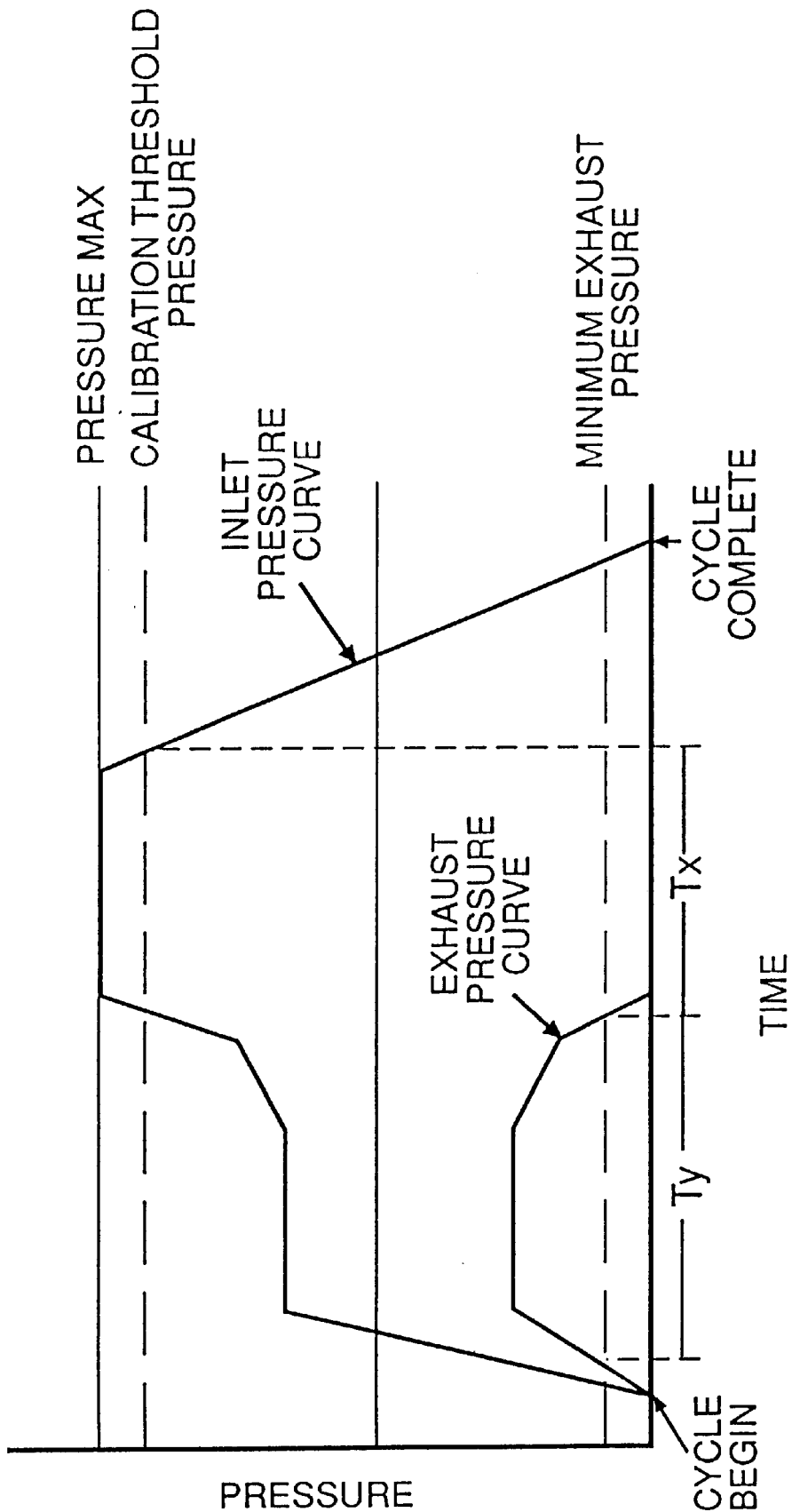

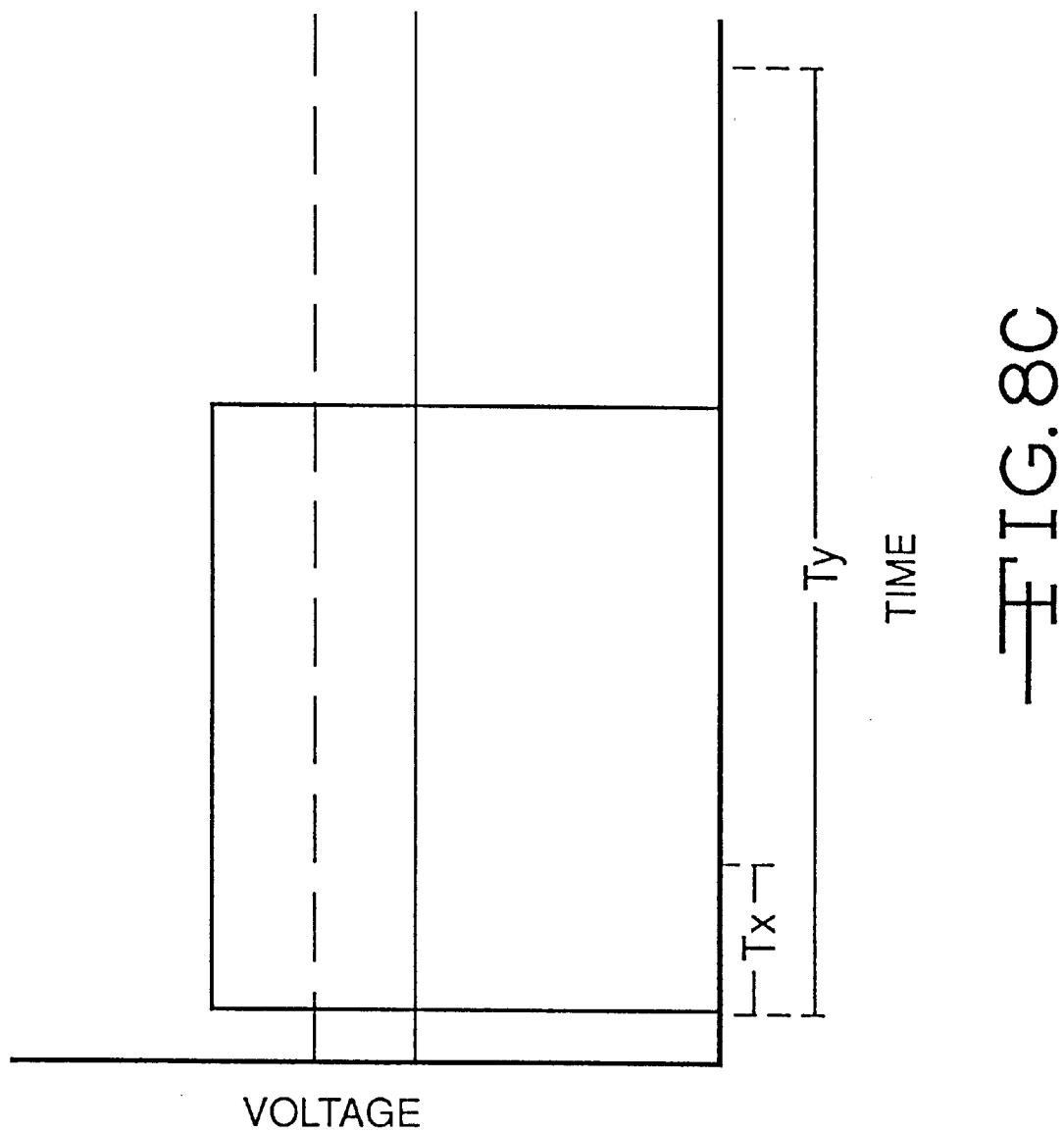

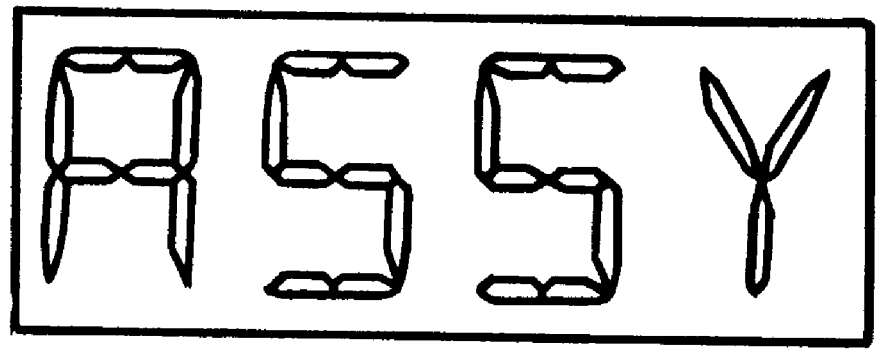
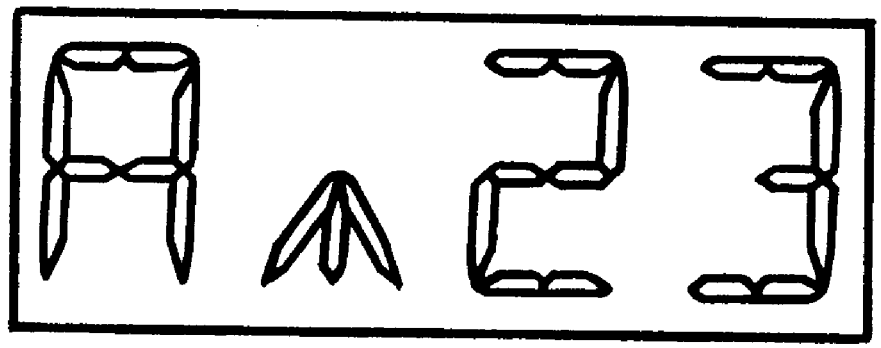
FIG. 9

TOOL MONITOR AND ASSEMBLY QUALIFIER

TECHNICAL FIELD

This invention relates to a tool monitor and assembly qualifier that verifies that the correct number of fasteners have been properly installed into an assembly. When used in conjunction with a pressure tool, proper fastener torque and count can be verified. The device monitors internal tool pressures and has the ability to "learn" the pressure characteristics of the tool during the assembly process.

BACKGROUND ART

Industry long has used compressed-air screw or bolt tighteners having a driving motor which drives a driving shaft for a screwing or tightening tool. The motor is operated by compressed air and a control valve for switching the compressed-air supply on or off. A pressure-regulating valve is used to regulate the screw or bolt tightener. While I use compressed air by way of example, fluids such as oil, electric current and mechanical pressure also can drive the tool. Programmable controllers and computers also are known to be a part of the closed loop for monitoring and controlling the driving force of the tool. See U.S. Pat. Nos. 5,439,063 and 5,592,396. None of these monitors and controls, however, verify a proper fastener torque or count. They merely control the force of the tool.

DISCLOSURE OF INVENTION

This assembly qualifier is a counting apparatus that monitors either the pressure of an air tool, the current of an electrical tool or the torque of a mechanical wrench to determine if the tool has shutoff at a target torque. The qualifier also determines if some unknown means shuts off the tool. While many versions may exist, I will discuss four different versions of the assembly qualifier. They are:

Version A—used on single ported air tools;
Version B—used for dual port air tools;
Version C—used with electrical tools; and
Version D—used with mechanical "click" (torque) wrenches.
Version A, single ported air tools will illustrate the system.

The system for monitoring a compressed air driven tool includes a transducer for measuring air pressure at a compressed air inlet to the tool and converting it into an electrical signal representative of the air pressure, means for electrically computationally processing the electrical signal into another signal representing at least one parameter corresponding to a condition of the tool being monitored which is a function of the air pressure, wherein the means for electrically processing the signal includes a programmed microprocessor configured to identify a portion of the signal representative of the air pressure corresponding to the parameter, and a means for displaying the parameter.

The programmed microprocessor is configured to identify a portion of the signal representative of the air pressure corresponding to a completed cycle. The configuration also allows for identification of an incomplete cycle and a multiple counting of completed cycle (double hit). A completed cycle occurs when a tool drives a fastener to the target torque. An incomplete cycle occurs when a tool drives a fastener and does not reach the target torque. A double hit occurs when a tool drives a fastener that has previously been tightened to the target torque.

To do this, the programmed microprocessor is configured to identify and store the parameter of a first period of time for the air pressure to attain a first predetermined range. The microprocessor also is configured to identify and store a second period of time for the air pressure to attain a second predetermined range.

The programmed microprocessor counts a completed cycle when the measured air pressure is the same as the identified and stored parameter. The programmed microprocessor identifies a multiple count (double hit) when the air pressure during the first period of time does not (or fails to attain) exceed the first predetermined range. The programmed microprocessor also identifies an incomplete count when the air pressure during the second period of time fails to attain the second predetermined range.

BRIEF DESCRIPTION OF THE DRAWINGS

FIG. 5B is a graph of a double hit from the tool of FIG. 1.

FIG. 5C is a graph of an incomplete cycle of the tool of FIG. 1

FIG. 6A is a graph of a completed cycle from the tool of FIG. 2.

FIG. 8C is a graph of an incomplete cycle of the tool of FIG. 4.

FIG. 9 is a representation of a typical display of the signal from a system according to this invention.

BEST MODE OF CARRYING OUT INVENTION

Figure 1:
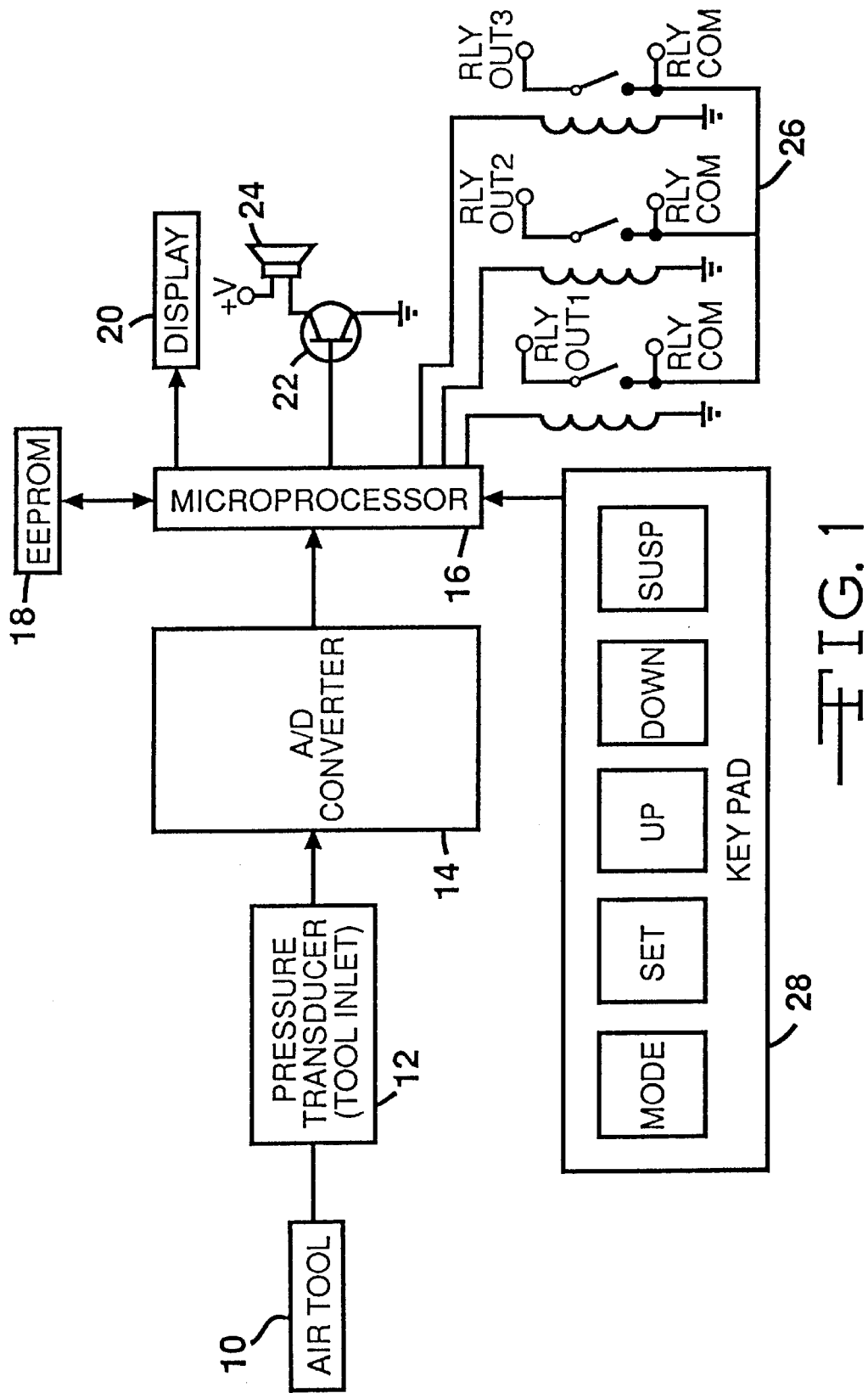
FIG. 1 is a block diagram for a monitoring system for an air tool using a single port air pressure format.

FIG. 1 illustrates version A a single port air tool. FIG. 1 shows air tool 10 connected to pressure transducer 12. Transducer 12 converts air pressure from the air inlet to tool 10 to electrical signals. A/D converter 14 receives the electrical signal from transducer 12 and converts them into binary code for use by microprocessor 16 and EEPROM 18. EEPROM 18 memorizes tool count characteristics and tool settings for up to four tools. Display 20 shows information as FIG. 9 depicts.

Transistor 22 connects microprocessor 16 to alarm 24 which indicates bad tool cycles (incomplete) and completed tool cycles. Relays 26 are NO or NC momentary or latching relay outputs. Output 1 provides a signal on a bad cycle (incomplete). Output 2 provides a signal on a completed cycle and output 3 provides a signal on a batch completion. Key pad 28 gives instructions to the system through micropressor 16.

When the unit first powers up, it enters assembly mode. If the unit is "locked", the assembly function is the only mode the user is allowed to access. When the unit is unlocked, the mode button allows the user to page through different features, including the assembly mode.

When entering the assembly mode, ASSY is displayed while the mode button is depressed. See FIG. 9. When the mode button is released, the user will see an A (signifying the parameter being used), an up or down arrow (informing the user which direction the unit is counting), and a two digit number. Units featuring the parameter selection switch will display an A, B, C or D, depending upon which tool has been selected by the switch. See FIG. 9.

If the unit is counting upward, every successful cycle will increment the counter on the display by one. Once the present number of screws in the assembly is reached, the count is reset to zero. If the unit is counting down, the preset will appear as the two digit number. Every successful cycle will decrement the count by one. Once zero is reached, the unit will reset the display to the preset. Every screw that is successfully completed lights the ACCEPT LED.

Upon completion of an assembly cycle, a double beep occurs and the assembly relay fires and then releases. The user may select whether the relay are normally OPEN or CLOSED by changing switch 1 on the S1 dip switch. The relay values may either be latching or momentary based upon the setting of switch 2 on the S1 dip switch.

Double hits on the same screw are ignored by the counter. If the tool is run in reverse or does not complete a cycle while tightening a screw, the REJECT LED is lit and the alarm lets out a short beep. When the REJECT LED comes on, a second relay fires. A status of that relay is also governed by the dip switch settings on switch 1 and switch 2.

The user may press the set/reset button to clear the present count. Once the user presses the set/reset button, the display will begin to flash. If the button is held long enough (approximately three seconds), the count will be reset to zero if the unit is counting up or the preset if the unit is counting down.

Setpoint Mode

When the unit is unlocked, the mode button will allow the user to access the setpoint mode. Upon entering the setpoint mode, the display will read STPA (if parameter set A is in use) until the mode button is released. Units that feature the tool selection switch will have varying messages when entering this mode. STPA, STPB, STBC or STPD may be displayed in order to alert the user which tool's setpoint is being viewed. Once the mode button is released, the display will read S (signifying setpoint mode), an up or down arrow (informing the user which direction the unit is counting), and a two digit number.

The two digit number is the preset number of screws in an assembly. This preset and the direction the unit counts is programmable in this state. If one or more of these parameters needs changed, the user may press the set/reset button. The entire display will begin flashing. If the set/reset button is held long enough, the display will stop flashing and only the least significant digit (LSD) of the preset will continue to flash. Using the UP or DOWN button, the user can change the digits value. Once the desired value is reached, pressing the set/reset button will accept that digit and the most significant digit (MSD) in the preset will begin flashing. The MSD can be adjusted in the same manner as the LSD.

After adjusting the MSD and pressing the set/reset button, the direction arrow will begin flashing. Pressing the up key will display an up arrow. Pressing the down key will cause the unit to display a down arrow. Pressing the set/reset will save the direction to as part of the parameter set in EEPROM memory.

At any point during the previously described process, the user may press the mode button. Pressing the mode button will allow the user to exit gracefully without saving a new preset.

If the unit contains a selector switch, changing the setpoint only effects the current tool setting. Therefore, the user can create up to four different count scenarios.

Total Mode

Pressing the mode button in setpoint mode will send the user to total mode. While the mode button is still depressed TTLA will be displayed (if parameter set A is selected). If the unit contains a selector switch, the message could vary as follows: TTLA, TTLB, TTLC or TTLD depending on the position of the switch.

After the mode button is released, the display will show a four digit number that represents the total number of units that have been completed. For example, if the preset was four it would take four screws to increment the total by one. Units that have a selector switch can keep track of four separate totals. Changing the selector switch at this point will allow the user to view all four of the totals.

When the total is incremented, a short double beep may occur depending on the setting of switch 3 on dip switch S1. The total can be reset to zero by pressing the set/rest button. The display will flash for approximately three seconds while the user holds the set/rest button. At the end of the three seconds, if the set/reset button is still held, the total will then be reset to zero. Only the total being viewed will be cleared on units that have the selector switch. Other totals will remain intact unless cleared in a similar fashion.

Any time the total changes, the value is stored in the units EEPROM. Therefore, powering the unit down does not cause the unit to "forget" the total.

Calibration Modes

The calibration modes are not intended to be accessed on a day-to-day basis. But an occasion may arise that the end user would have to have access to these modes. If a different tool is used or if the counter would stop counting properly, the calibration modes could help diagnose and correct problems.

It is purposely difficult to enter the calibration mode, so that the user does not end up there by accident.

The unit must be unlocked and in assembly mode if the user wishes to enter calibration mode. If the mode button is pressed and held followed by the set/reset button being pressed, calibration mode is entered.

Tool Calibration A, B, C and D

The first stage in the calibration modes is the tool calibration. While the mode button is pressed, CLBR will be displayed. Once the mode button is released TOOL will remain on the display. Pressing the SET/RESET button will cause the unit to display the live analog values. For Versions A and B, those analog values would represent pressures. In Version D, the value will represent the state of the torque switch. In Version C, the analog values represent current on the forward and reverse current channels.

This mode may be used to diagnose if the tool and circuit are working properly. If, while running the tool, the user does not see the analog values rise and fall, the user should investigate the problem. A faulty pressure current transducer, a twisted or broken air hose connection, or a faulty tool could cause this to happen.

The microprocessor monitors the analog values during this mode. In order to calibrate the counter, the tool should be run in the air so that the microprocessor can monitor the analog values associated with the "free running" condition. In Version C, the user should run the tool both in forward and reverse. After running the tool in the air, the user can press the set/reset button to accept new tool calibration set points. Or, the user may elect to press the mode button and exit the tool calibration mode without altering the set points.

In order to work with some tools, it may be best to choose a higher analog value for this set point. The user can monitor the analog values in the calibration mode and see the range of values the assembly qualifier sees. As a blot is run down, the analog value should rise to a maximum at shut-off. After monitoring a complete cycle, the user should exit the tool calibration mode and re-enter it. While in the calibration mode the second time, press the SET button at the pressure that is desired for a calibration point. Do not do this during the same cycle that a complete run-down has occurred. The assembly qualifier will remember the maximum analog value it sees in this mode.

The parameter switch should remain in one location throughout calibration. The calibration values are parameter switch dependent. Therefore, four different calibrations can be stored in order to allow the user to switch between tools or joint settings.

Threshold Percentage

After the user presses set/reset or mode in order to complete the tool calibration, the unit will enter threshold mode. When entering this mode, the unit will display THRx where x is either A, B, C or D representing the parameter set that is being adjusted. When the mode button is released, the unit will display TH and a two digit number. The two digit number represents the percentage of the analog values that will be subtracted (or added and subtracted in the case of Version B) to the free run analog value in order to create a calibration window.

In Version A and D

If the maximum analog value during free run was 60 and the threshold is set to 10 percent, then a lower count window will be created at 54.

In Version B

If the maximum analog value during free run was 60 and the threshold is set to 10 percent, then a lower counter window is created at 54 and an upper count window is created at 66.

In Version C

If the maximum analog value during free run on the forward channel was 60 and the maximum on the reverse channel was 50 then a lower count window will be set for the forward channel at 54 and a lower count window will be set for the reverse channel at 45.

The threshold is adjustable from 2 to 65 percent. Pressing the set/reset button will allow the user to adjust this value. Pressing the mode button will send the unit into the next mode.

Timer X Set Point

When the unit enters this mode TMXz will be displayed, where z will either be an A, B, C or D depending on the parameter set that is being adjusted. Once the mode button is released, TX and a two digit number will appear on the display. The two digit number represents a time in 10 ms increments. This number is adjustable from 00 to 99 (or 10 ms to 990 ms). Timer X's use is version dependent.

In Version A, Timer X is the amount of time the analog inlet value must remain above the count window to be legitimate. In Version B, Timer X is the amount of time the analog inlet value must remain inside the count window before rising above it in order for a legitimate count to occur. In Version D, Timer X is used as a de-bounce timer. The signal is ignored until it has remained above the count window for this amount of time. In Version C, Timer X is the amount of time the forward channel's analog value must be above the count window for a legitimate count to occur. If Timer X is made to be zero or too small, the counter may be fooled by running the tool in the air, running the tool in reverse, or not tightening the screw completely. If Timer X is made to be too large, short screws may be ignored.

Timer Y Set Point

When the unit enters this mode, TMYz will be displayed where z will either be an A, B, C or D depending on the parameter set that is being adjusted. Once the mode button is released, TY and a two digit number will appear on the display. The two digit number represents a time in 10 ms increments. This number is adjustable from 00 to 99 (or 10 ms to 990 ms). Timer Y's use is version dependent.

In Version A, Timer Y is used to determine if the exhaust signal was present for an appropriate amount of time. In Version B, Timer Y is used to determine if the inlet signal remained above the count window long enough. In Version D, Timer Y is used to determine if the torque switch remained closed long enough to be a valid count. In Version C, Timer Y is used to determine if the analog value on the reverse channel remained above its count threshold long enough to be considered valid. If Timer Y is made to be zero or too small, the counter may be fooled by running the tool in the air, running the tool in reverse, or not tightening the screw completely. If Timer Y is made to be large, short screws may be ignored.

View Total

The view total mode has two options yes or no. If the user chooses yes, the unit will be allowed to toggle between assembly and total mode when the unit is locked. If the user chooses no, only the assembly mode will be visible when the unit is locked. VTOT will be on the display until the user releases the mode button. Then both a "Y" and an "N" will be visible. Either the Y or N will be flashing. To switch between the yes and no states, the user must press the UP and DOWN button. Once the unit is in the desired state, pressing SET will save the VTOT information. Pressing mode allows the user to exit without saving new information.

Counting Function

The counting function is dependent of the mode the unit is in. This means that the user may perform adjustments and calibrations "on the fly" without losing track of which assembly or screw has been completed.

Figure 5A:
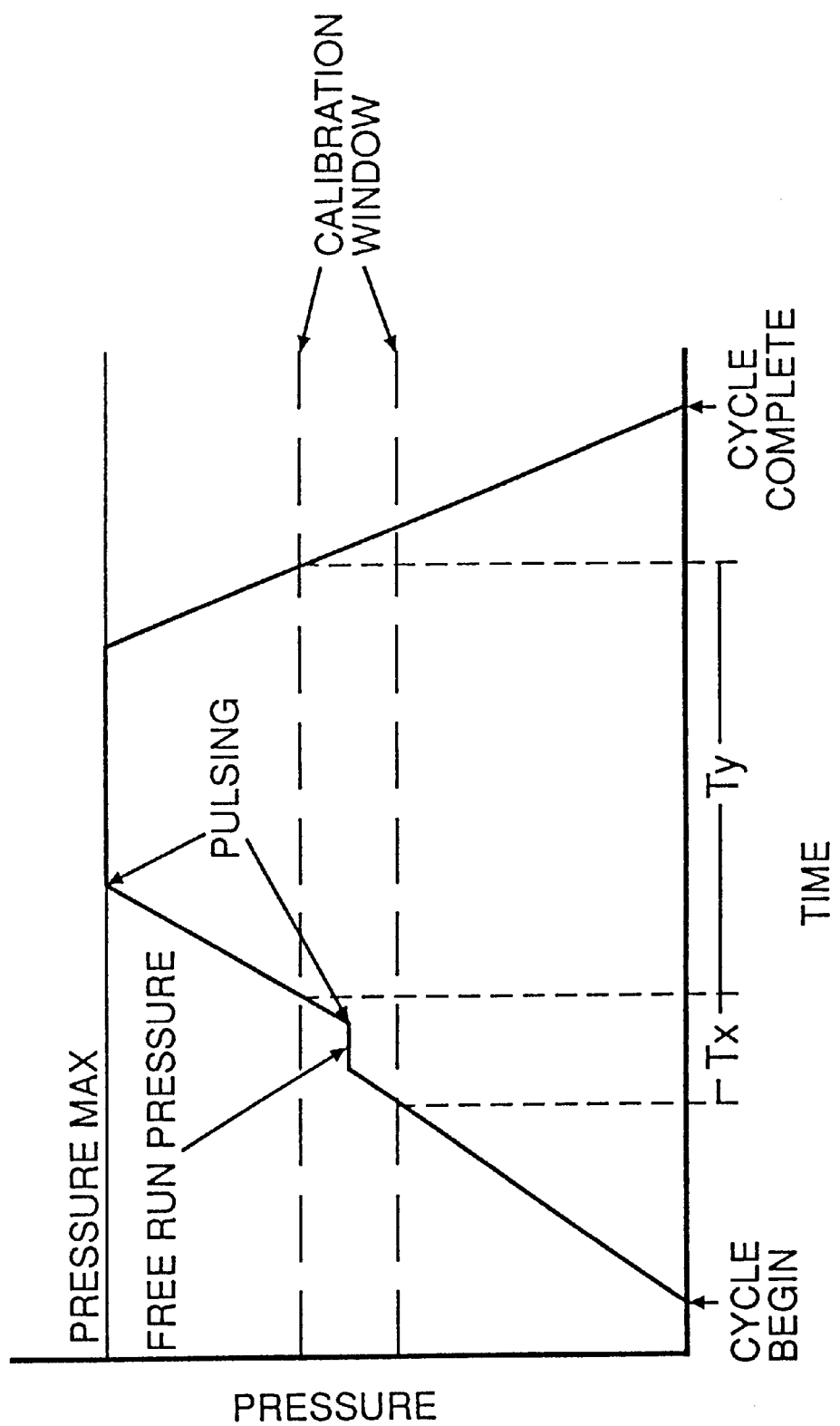
FIG. 5A is a graph of a completed cycle from the tool of FIG. 1.

FIG. 5A is a graph of the programming for version A in FIG. 1 for a completed cycle. FIG. 5B is a graph of a double hit showing no free run pressure, but a straight line to max pressure. FIG. 5C is a graph of an incomplete cycle which stays at free run pressure and never reaches max pressure. TY never starts because the pressure never rises above the calibration window.

Figure 2:
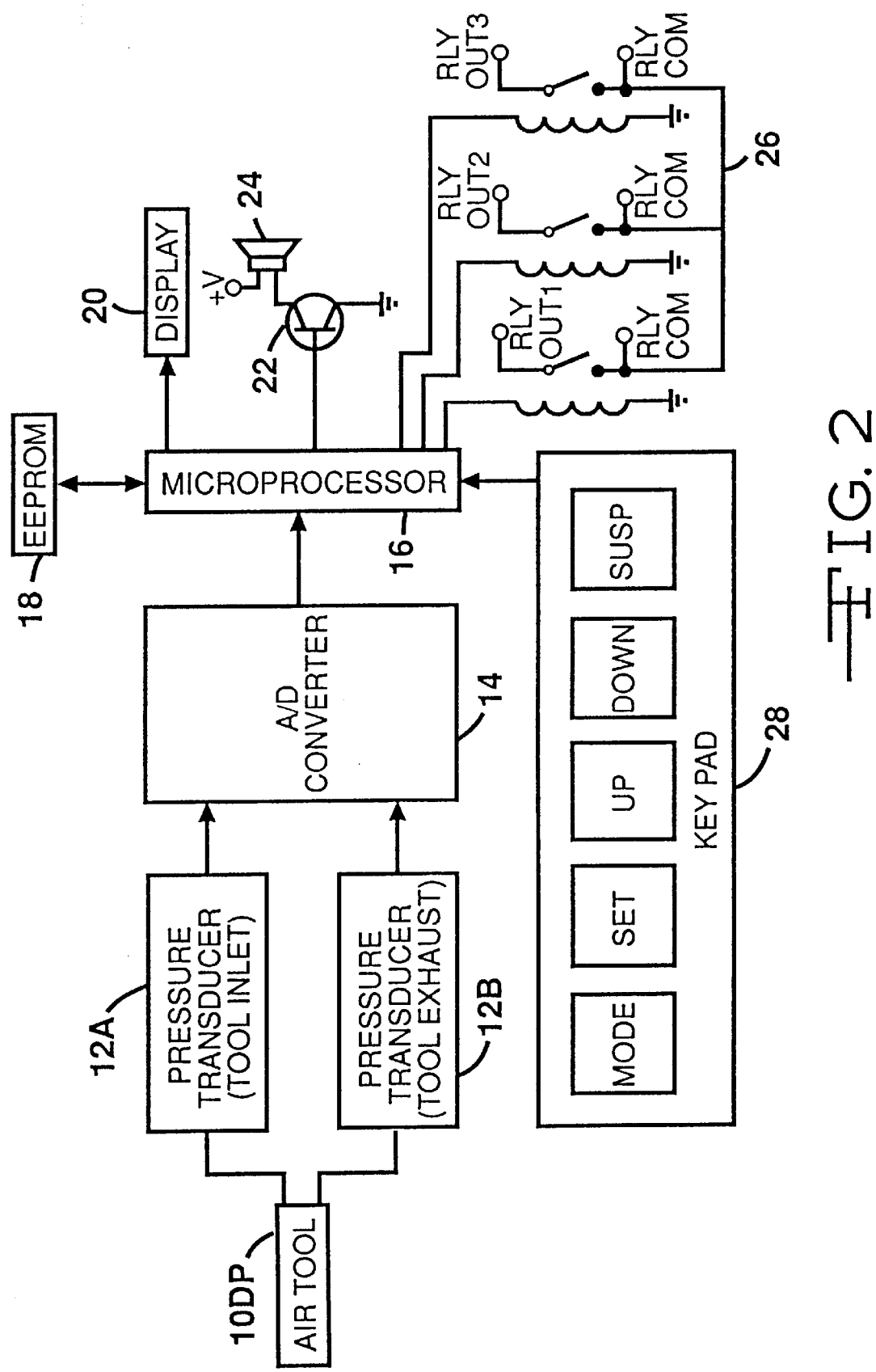
FIG. 2 is a block diagram for a monitoring system for an air tool using a dual port air pressure format.

FIG. 2 shows dual port air tool 10 DP (version B). Air pressure transducer 12A is connected to tool 10's inlet and air pressure transducer 12B is connect to tool 10's exhaust outlet. Both transducers then connect to A/D converter. The remainder of FIG. 2 is the same as FIG. 1.

Figure 6B:
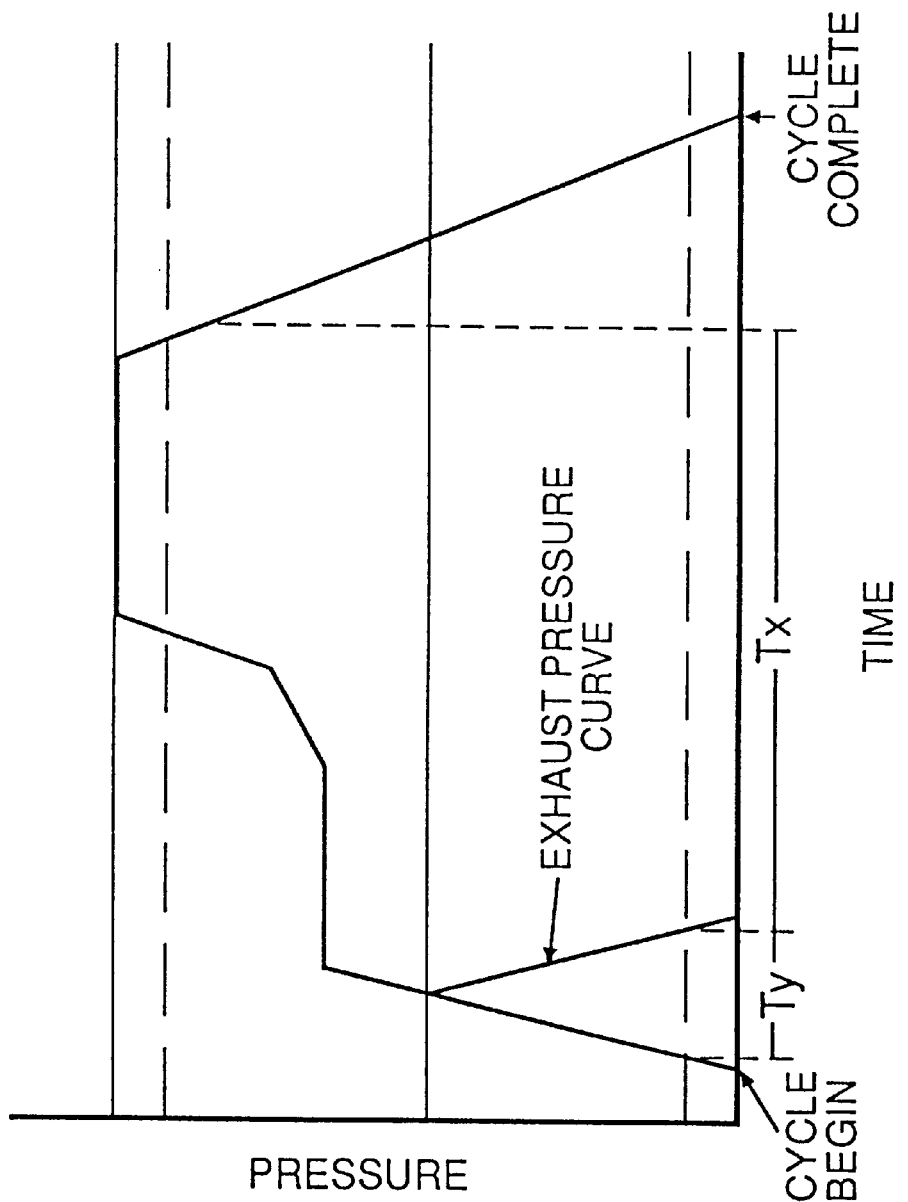
FIG. 6B is a graph of a double hit of the tool of FIG. 2
Figure 6C:
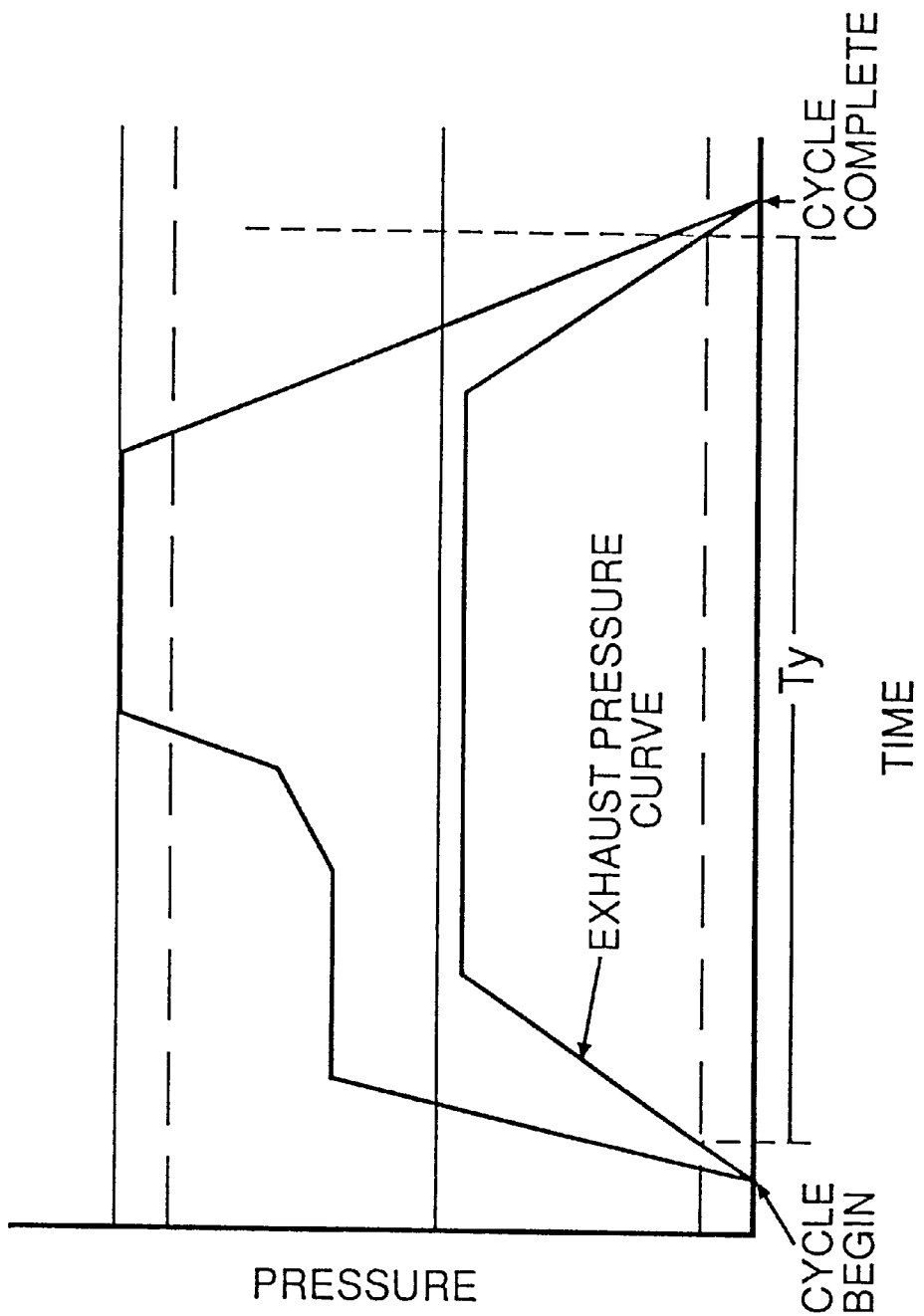
FIG. 6C is a graph of an incomplete cycle of the tool of FIG. 2

FIG. 6A shows a graph of the programming for air tool 10 DP in FIG. 2. FIG. 6B shows a double hit where the exhaust curve is a short, fast spike instead of the exhaust curve of FIG. 6A. FIG. 6C shows an incomplete count where the exhaust curve is long and exceeds time TY. TX never starts because pressure is below calibration window at end of exhaust curve.

Figure 3:
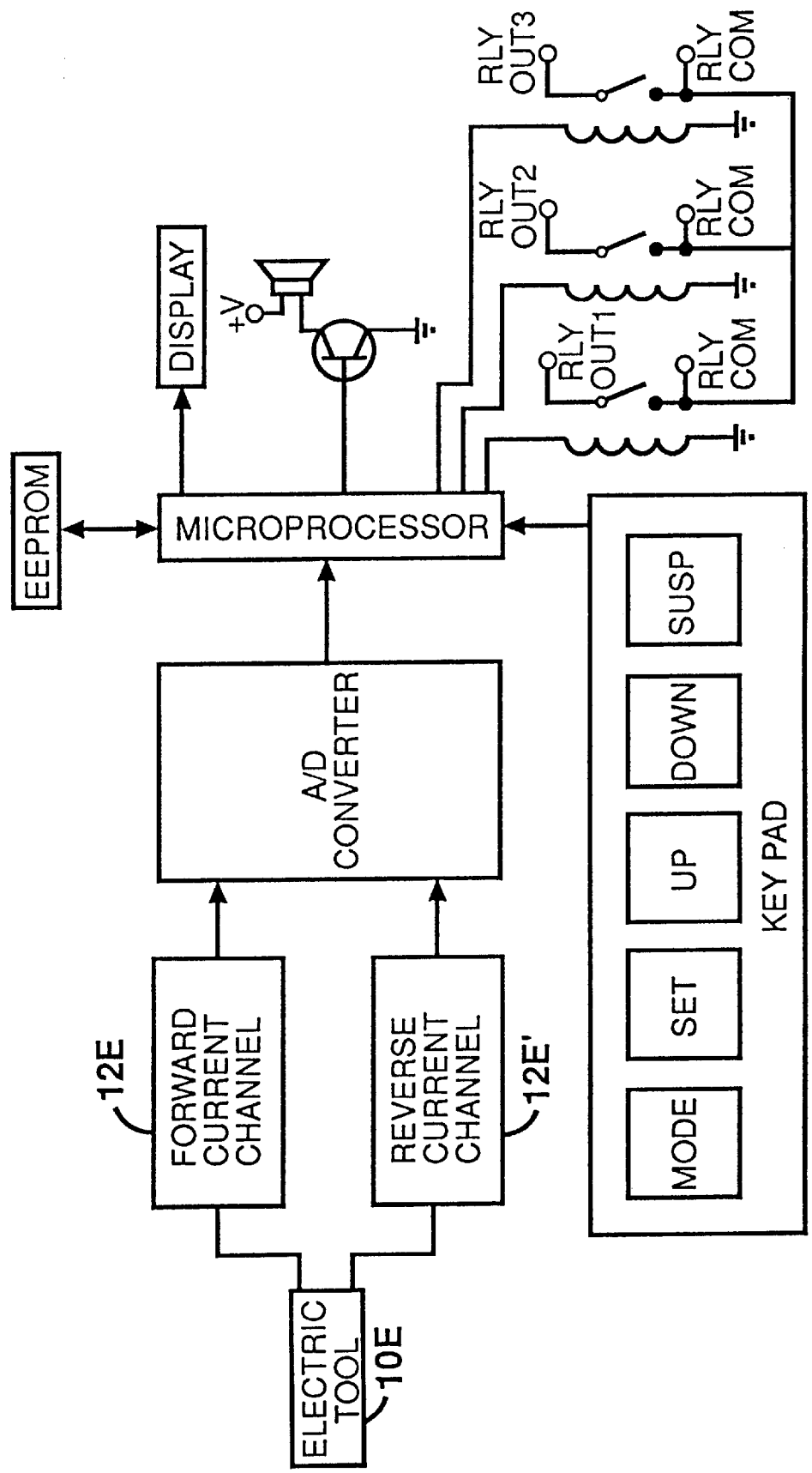
FIG. 3 is a block diagram for a monitoring system for an electrical tool using an output current level format.

FIG. 3 shows electric current mode (version C). Electric tool 10E is connected to A/D converter 14 through current transducer 12E and 12E'. The current transducers are hall effect transducers. Current transducer 12E measures the forward current channel of electric tool 10E and current transducer 12E' measure the reverse current channel of tool 10E. The remainder of FIG. 3 is the same as FIG. 1.

Figure 7A:
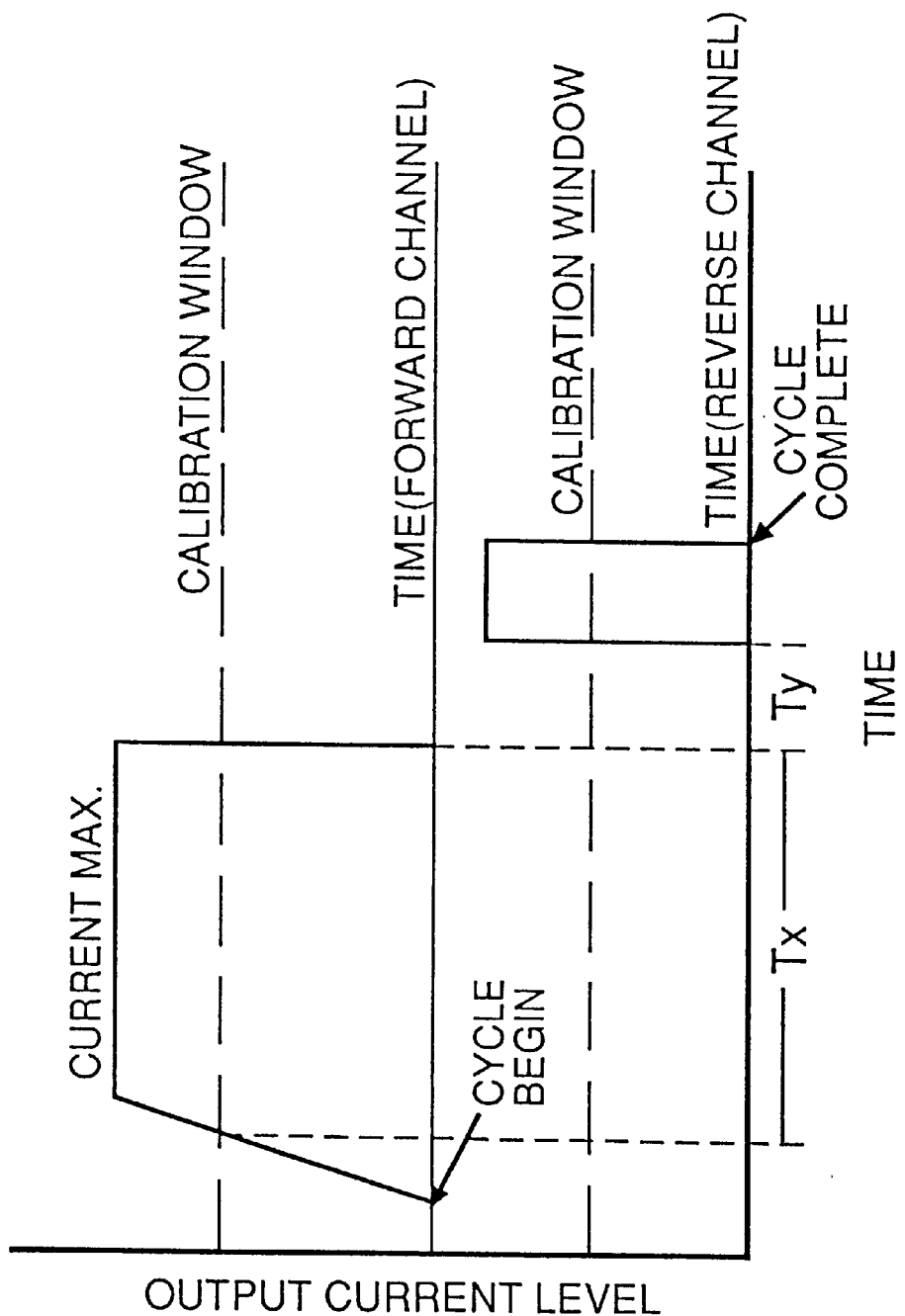
FIG. 7A is a graph of a completed cycle from the tool of FIG. 3.
Figure 7B:
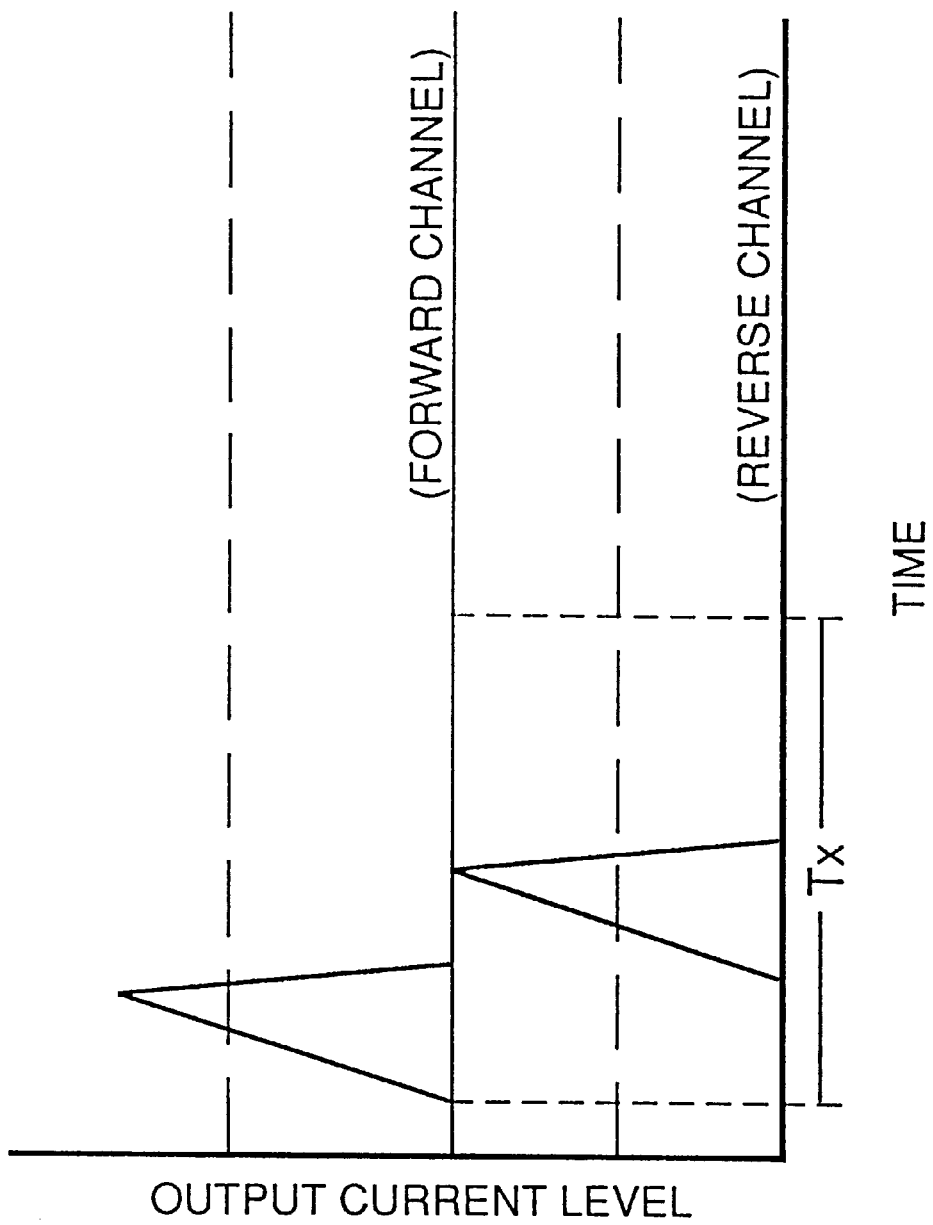
FIG. 7B is a graph of a double hit of the tool of FIG. 3.
Figure 7C:
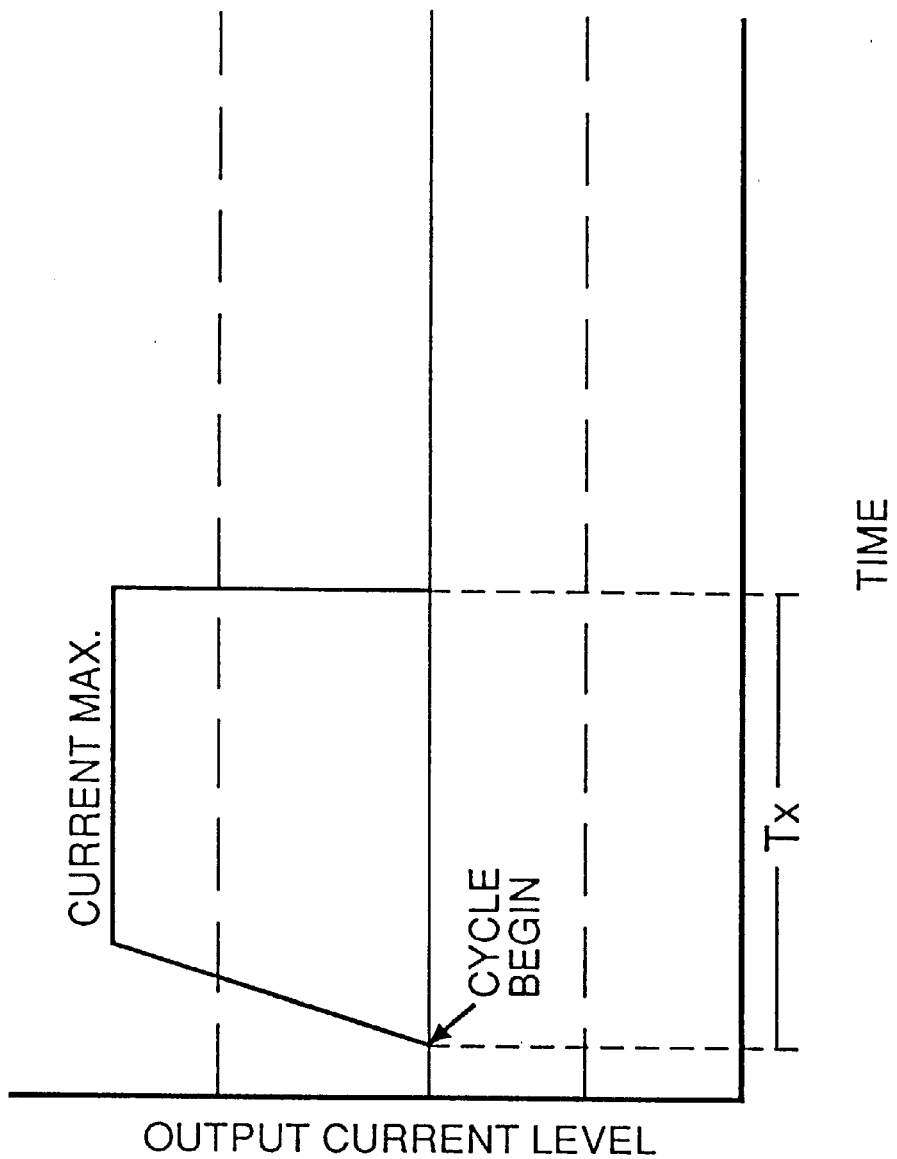
FIG. 7C is a graph of an incomplete cycle of the tool of FIG. 3.
Figure 7D:
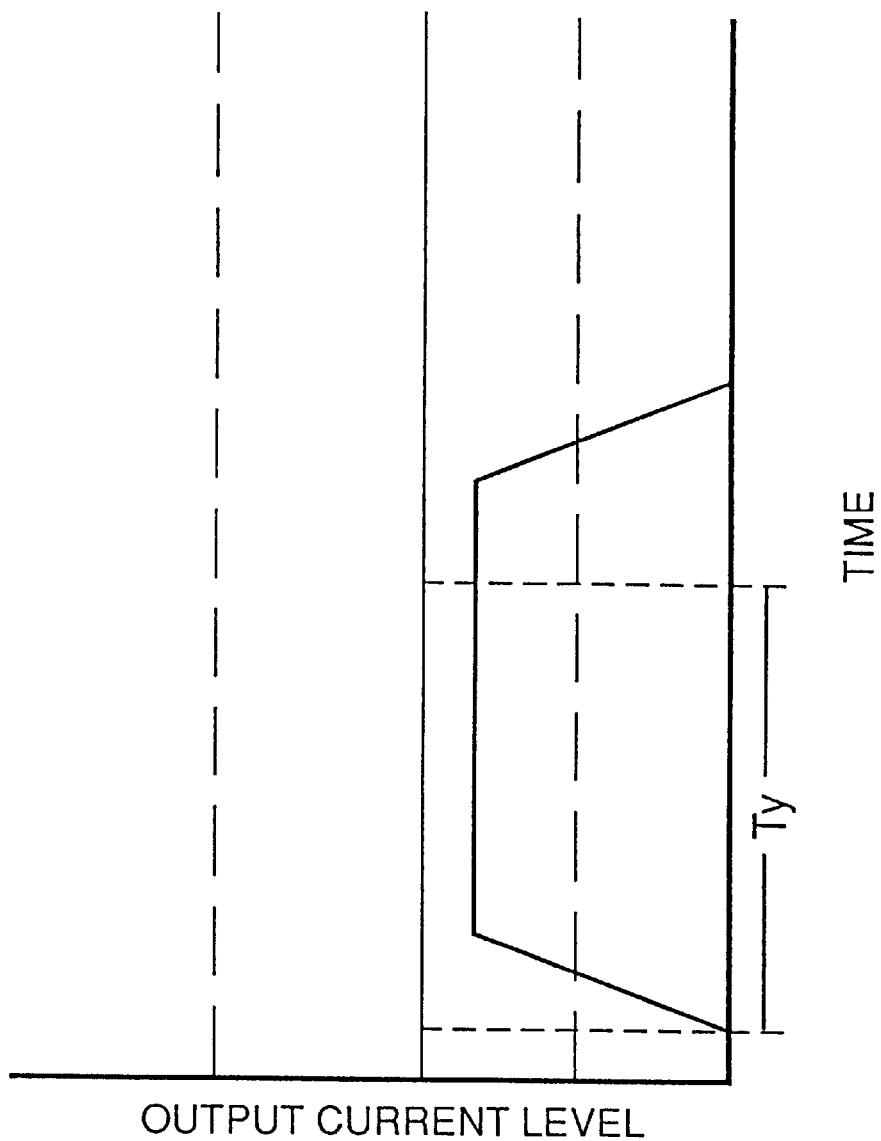
FIG. 7D is a graph of an incomplete cycle of the tool of FIG. 3.

FIG. 7A shows the graph for a program for a completed cycle of electric tool 10E in FIG. 3. FIG. 7B shows a double hit where both curves are short spike to max current. FIG. 7C shows an incomplete cycle where the reverse channel never engages. FIG. 7D shows an incomplete cycle where the forward channel never provides current to the tool. Time TX is zero.

Figure 4:
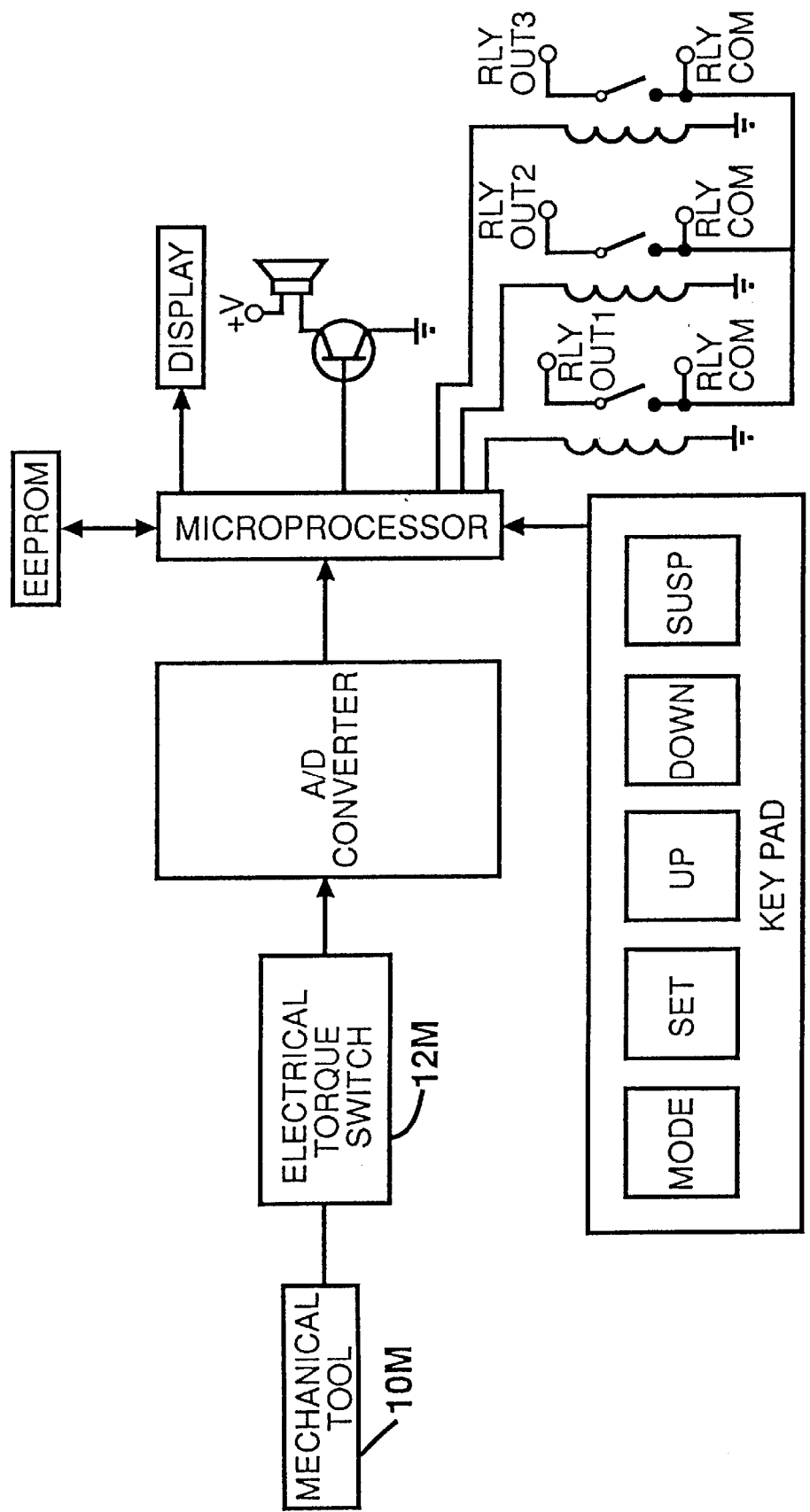
FIG. 4 is a block diagram for a monitoring system for an mechanical tool using a mechanical output format.

FIG. 4 shows mechanical tool 10M (version D). Torque switch 12M is an electrically stimulated switch that provides an electrical signal upon the mechanical wrench reaching target torque. Here AD converter 14 reads the closure of micro torque switch 12M and converts it into binary code. The AD converter reads the voltage of the torque switch. The voltage is an analog representation.

Figure 8A:
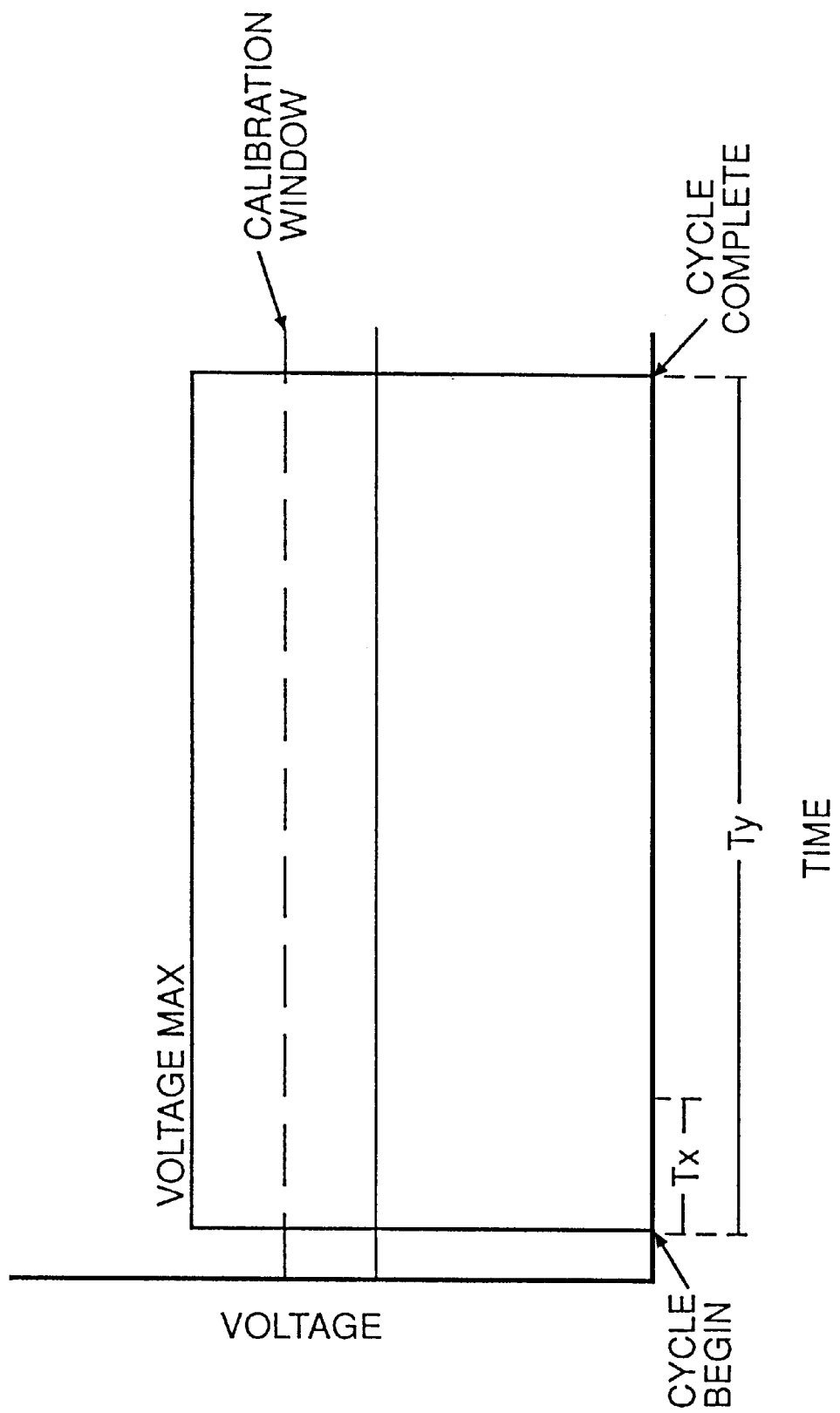
FIG. 8A is a graph of a completed cycle from the tool of FIG. 4.
Figure 8B:
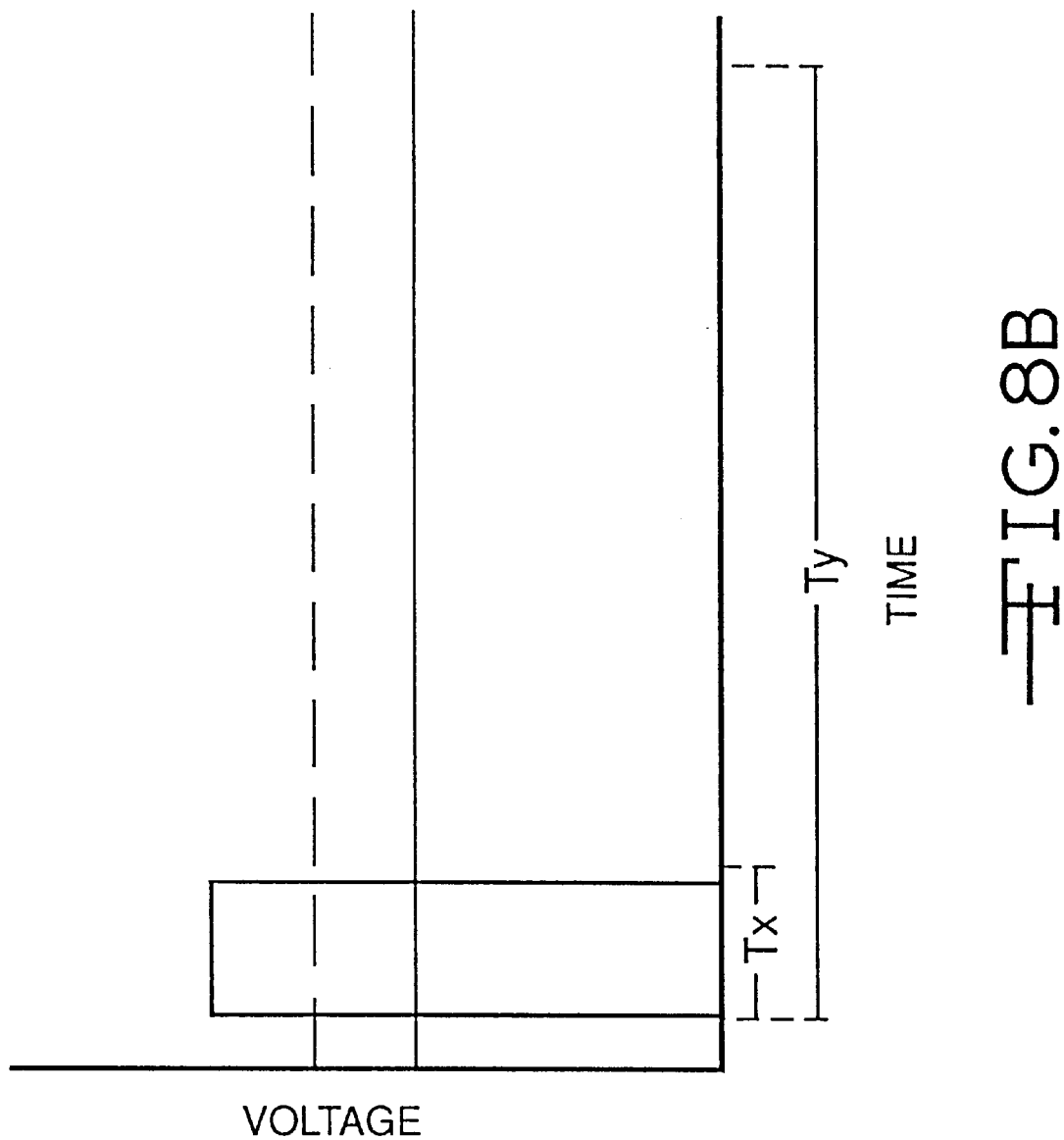
FIG. 8B is a graph of a double hit of the tool of FIG. 4.

FIG. 8A shows a completed cycle for mechanical tool 10M where the max voltage of torque switch 12M is reached across both time cycles. FIG. 8B shows a double hit where max voltage is reached for a very short period of time less than TX. A cycle less than TX is ignored by the counter. FIG. 8C shows an incomplete cycle where max voltage is not held for the predetermined length of time TY.

The tools used with this invention are conventional and well known in the art. The labeled rectangular box of the Figures adequately represent them. U.S. Pat. No. 5,377,578 illustrates air tools and related components which one could use with the monitor of the invention. U.S. Pat. Nos. 5,567,886 and 5,592,396 disclose other fluid driven tools using compressed air, electronics or mechanical advantage which depend upon torque to perform their operation. The monitor of our invention is used with no modification to the tool. Measuring the parameters discussed provides the necessary input to the monitor/assembly qualifier we claim. The monitor of this invention does not control the tool. The key is measure a parameter and use it to verify what the tool does. The monitor of this invention is a counting apparatus.

I claim:

1. A system for monitoring a compressed air driven tool comprising:

a transducer for measuring air inlet pressure to the tool and converting the air pressure into an electrical signal representative of the air pressure;

means for electrically computationally processing the electrical signal into another signal representing at least one parameter corresponding to a condition of the tool being monitored which is a function of the air pressure, wherein the means for electrically processing the signal includes a programmed microprocessor configured to Identify a portion of the signal representative of the air pressure corresponding to the parameter; and a means for displaying the parameter, wherein the programmed microprocessor is configured to count a completed cycle when the measured air pressure is the same as the identified and stored parameter, wherein the programmed microprocessor is configured to identify a portion of the signal representative of the air pressure of the tool driving a fastener to its target torque and successfully completing a cycle, and wherein the programmed microprocessor is configured to count a completed cycle, store the count and generate signals when the measured air pressure is the same as the identified and stored parameter.

2. A system according to claim 1 wherein the programmed microprocessor is configured to identify and store a portion of the air pressure as a calibration value.

3. A system according to claim 2 wherein the programmed microprocessor is configured to identify and store the parameter of a threshold corresponding to the calibration value.

4. A system according to claim 1 wherein the programmed microprocessor is configured to identify and store the parameter of a first period of time for the air pressure to attain a first predetermined range and also is configured to identify and store a second period of time for the air pressure to attain a second predetermined range, wherein the programmed microprocessor is configured to identify a multiple count when the air pressure during the first period of time fails to attain the first predetermined range and wherein the programmed microprocessor is configured to identify an incomplete count when the air pressure during the second period of time fails to attain the second predetermined range.

5. A system according to claim 1 wherein the programmed microprocessor is configured to identify a portion of the signal representative of air pressure of the tool driving a fastener and not reaching target torque and unsuccessfully completing a cycle, wherein the programmed microprocessor is configured to generate signals when a cycle is completed unsuccessfully.

6. A system according to claim 1 wherein the programmed microprocessor is configured to identify a portion of the signal representative of the air pressure of the tool driving a fastener that has previously been tightened to the target torque, wherein the programmed microprocessor is configured to generate signals when a fastener has been previously tightened.

7. A system for monitoring a compressed air driven tool comprising:

a transducer for measuring air inlet pressure to the tool and converting the air pressure into an electrical signal representative of the air inlet pressure;

a transducer for measuring air exhaust outlet pressure from the tool and converting the air pressure into an electrical signals representative of the air exhaust outlet pressure;

means for electrically computationally processing the electrical signals into other signals representing at least one parameter corresponding to a condition of the tool being monitored which is a function of the air pressures, wherein the means for electrically processing the signals includes a programmed microprocessor configured to identify a portion of the signal representative of the air pressure corresponding to the parameter; and a means for displaying the parameter, wherein the programmed microprocessor is configured to count a completed cycle when the measure air pressures are the same as the identified and stored parameter, wherein the programmed microprocessor is configured to identify a portion of the signal representative of the air pressures of the tool driving a fastener to its target torque and successfully completing a cycle, and wherein the programmed microprocessor is configured to count a completed cycle, store the count and generate signals when the measured air pressures is the same as the identified and stored parameters.

8. A system according to claim 7 wherein the programmed microprocessor is configured to identify and store a portion of the inlet air pressure signal and the exhaust air pressure signal as calibration values.

9. A system according claim 8 wherein the programmed microprocessor is configured to identify and store the parameter of a threshold corresponding to the inlet air pressure value.

10. A system according to claim 7 wherein the programmed microprocessor is configured to identify and store the parameter of a first period of time for the air pressures to attain a first predetermined range and is also configured to identify and store a second period of time for the air pressures to attain a second predetermined range, wherein the programmed microprocessor is configured to identify a multiple count when the air pressures during the first period of time fail to attain the first predetermined range and wherein the programmed microprocessor is configured to identify an incomplete count when the air pressures during the second period of time fail to attain the second predetermined range.

11. A system according to claim 7 wherein the programmed microprocessor is configured to identify a portion of the signal representative of air pressure of the tool driving a fastener and not reaching target torque and unsuccessfully completing a cycle, wherein the programmed microprocessor is configured to generate signals when a cycle is completed unsuccessfully.

12. A system according to claim 7 wherein the programmed microprocessor is configured to identify a portion of the signal representative of the air pressures of driving a fastener that has previously been tightened to the target torque, wherein the programmed microprocessor is configured to generate signals when a fastener has been previously tightened.

* * * * *